(12) United States Patent
Golpayegani et al.

(10) Patent No.: US 10,579,586 B1
(45) Date of Patent: Mar. 3, 2020

(54) DISTRIBUTED HASH OBJECT ARCHIVE SYSTEM

(71) Applicant: United States of America as represented by the Administrator of NASA, Washington, DC (US)

(72) Inventors: Navid Golpayegani, Greenbelt, MD (US); Curt A. Tilmes, Bel Air, MD (US); Damon N. Earp, Lanham, MD (US); Jihad S. Ashkar, Lanham, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 16/058,383

(22) Filed: Aug. 8, 2018

Related U.S. Application Data

(60) Provisional application No. 62/557,919, filed on Sep. 13, 2017.

(51) Int. Cl.
*G06F 16/11* (2019.01)
*G06F 16/901* (2019.01)

(52) U.S. Cl.
CPC .......... *G06F 16/113* (2019.01); *G06F 16/122* (2019.01); *G06F 16/9014* (2019.01)

(58) Field of Classification Search
CPC .... G06F 16/113; G06F 16/122; G06F 16/901; G06F 16/9014
See application file for complete search history.

(56) References Cited

U.S. PATENT DOCUMENTS

| 2017/0228371 A1* | 8/2017 | Seger, II | G06F 16/215 |
| 2019/0182028 A1* | 6/2019 | Arquero | H04L 9/3297 |

(Continued)

OTHER PUBLICATIONS

Ravi Kiran Raman-Lav R. Varshney-Distributed Storage Meets Secret Sharing on the Blockchain—University of Illinois at Urbana-Champaign-IEEE-Feb. 2018 (Year: 2018).*

(Continued)

*Primary Examiner* — Midys Rojas
*Assistant Examiner* — Khoa D Doan
(74) *Attorney, Agent, or Firm* — Christopher O. Edwards; Bryan A. Geurts

(57) ABSTRACT

A method of managing objects in an archive system includes assigning a number of addresses to each of a plurality of nodes, dividing an object into a sequence of blocks, uniformly distributing the sequence of blocks across the plurality of nodes by, calculating a hash value of a unique identifier of the object to be used as an address for a first block in the sequence, storing the first block at a node to which the address is assigned, for each subsequent block in the sequence, calculating a subsequent address from a hash value of the address of an immediately previous block in the sequence and storing the subsequent block at a node to which the calculated subsequent address is assigned, iteratively calculating a hash value of the hash value of the subsequent address if the calculated subsequent address is assigned to a node where a previous block is stored, and storing the subsequent block at a node to which an address corresponding to the iteratively calculated hash value is assigned.

14 Claims, 4 Drawing Sheets

(56) References Cited

U.S. PATENT DOCUMENTS

2019/0190896 A1\* 6/2019 Singh ................. H04L 63/0435
2019/0199514 A1\* 6/2019 Hari ..................... H04L 9/0637

OTHER PUBLICATIONS

Jiang Zhou, Wei Xie, Jason Noble, Kace Echo, Yong Chen, SOURA: A Scalable and Uniform Data Distribution Algorithm for Heterogeneous Storage Systems. 2016 IEEE International Conference on Networking, Architecture and Storage (NAS). (Year: 2016).\*

\* cited by examiner

DISTRIBUTED HASH OBJECT ARCHIVE SYSTEM

INVENTION BY GOVERNMENT EMPLOYEE(S) ONLY

The invention described herein was made by one or more employees of the United States Government, and may be manufactured and used by or for the Government for governmental purposes without the payment of any royalties thereon or therefor.

ORIGIN OF THE INVENTION

Background

The disclosed embodiments generally relate to a system for storing and managing data objects.

Scientific data sets, such as those from the Large Hadron Collider and the Sloan Digital Sky Survey are growing constantly and are producing Petabytes of data. This amount of data is typically organized as hundreds of millions of files in various systems with some type of central storage management. However, the central storage management of these large scale systems may introduce processing delays and the central storage management itself may represent a point of failure that may affect access to the stored data. It would be advantageous to provide a system that operates without a central authority while providing a recoverable data storage capability.

SUMMARY

The disclosed embodiments are directed to a method of managing objects in an archive system. The method includes assigning a number of addresses to each of a plurality of nodes of the archive system, dividing an object into a sequence of blocks for storage, uniformly distributing the sequence of blocks across the plurality of nodes by, calculating a hash value of a unique identifier of the object, the hash value to be used as an address for a first block in the sequence and storing the first block at a node to which the address is assigned, for each subsequent block in the sequence, calculating a subsequent address from a hash value of the address of an immediately previous block in the sequence and storing the subsequent block at a node to which the calculated subsequent address is assigned, iteratively calculating a hash value of the hash value of the subsequent address if the calculated subsequent address is assigned to a node where a previous block is stored, and storing the subsequent block at a node to which an address corresponding to the iteratively calculated hash value is assigned.

Dividing the object into a sequence of blocks for storage may include adding null data to the object to achieve a number of same size blocks into which the object is to be divided, and adding one or more erasure blocks to the object for recovering the object if one or more of the same size blocks are corrupted.

The one or more erasure blocks may be replicas of one or more of the same size blocks.

The method further includes maintaining a distribution map of assigned block addresses for each node, and periodically comparing an address of a block to the assigned block addresses of the distribution map; and moving the block to the address to which the block is assigned in the distribution map if the address of the block does not match the block address is assigned in the distribution map.

The method further includes periodically retrieving an object from the archive system, upon verifying that all the blocks of the object exist and have matching validation data, retrieving a next object, otherwise recovering missing blocks utilizing one or more erasure blocks added to the object when stored, recovering blocks with incorrect metadata utilizing the one or more erasure blocks, assembling the existing blocks and the recovered blocks as the object, and storing the existing blocks and the recovered blocks according to a distribution map of assigned block addresses for each node.

The method further includes retrieving the object stored in the archive system, upon verifying that all the blocks of the object exist and have matching validation data, serving the object to a client, otherwise recovering missing blocks utilizing one or more erasure blocks added to the object when stored, recovering blocks with incorrect metadata utilizing the one or more erasure blocks, assembling the existing blocks and the recovered blocks as the object, storing the existing blocks and the recovered blocks according to a distribution map of assigned block addresses for each node, and serving the object to the client.

The method further includes deleting the object stored in the archive system by providing a copy of the object with the object's unique identifier, zero length data, and metadata with a more recent time stamp and a delete object flag, using a retrieval process to return an indication that the object does not exist upon recognizing the time stamp as indicating other objects with the same unique identifier are invalid and recognizing the delete record flag, and deleting the copy of the object after a certain period of time.

The disclosed embodiments are further directed to a distributed object archive system including a plurality of nodes, each node comprising a processor, a memory including computer program code, wherein executing the computer program code by the processor causes the distributed object archive system to assign a number of addresses to each node of the plurality of the nodes of the archive system, divide an object for storage into a sequence of blocks, uniformly distribute the blocks across the nodes by calculating a hash value of a name of the object, the hash value to be used as an address for a first block in the sequence and storing the first block at a node to which the address is assigned, for each subsequent block in the sequence, calculating a subsequent address from a hash value of the address of an immediately previous block in the sequence and storing the subsequent block at a node to which the calculated subsequent address is assigned, iteratively calculating a hash value of the hash value of the subsequent address if the calculated subsequent address is assigned to a node where a previous block is stored, and storing the subsequent block at a node to which an address corresponding to the iteratively calculated hash value is assigned.

Dividing the object into a sequence of blocks for storage may include adding null data to the object to achieve a number of same size blocks into which the object is to be divided, and adding one or more erasure blocks to the object for recovering the object if one or more of the same size blocks are corrupted.

The one or more erasure blocks may be replicas of one or more of the same size blocks.

The distributed object archive system may include a distribution map of assigned block addresses for each node, wherein executing the computer program code by the processor causes the distributed object archive system to periodically compare an address of a block to the assigned block addresses of the distribution map, and move the block to the address to which the block is assigned in the distribution map if the address of the block does not match the block address is assigned in the distribution map.

Executing the computer program code by the processor may cause the distributed object archive system to periodically retrieve an object from the archive system, upon verifying that all the blocks of the object exist and have matching validation data, retrieve a next object, otherwise, recover missing blocks utilizing one or more erasure blocks added to the object when stored, recover blocks with incorrect metadata utilizing the one or more erasure blocks, assemble the existing blocks and the recovered blocks as the object, and store the existing blocks and the recovered blocks according to a distribution map of assigned block addresses for each node.

Executing the computer program code by the processor may cause the distributed object archive system to retrieve the object stored in the archive system, upon verifying that all the blocks of the object exist and have matching validation data, serve the object to a client, otherwise, recover missing blocks utilizing one or more erasure blocks added to the object when stored, recover blocks with incorrect metadata utilizing the one or more erasure blocks, assemble the existing blocks and the recovered blocks as the object, store the existing blocks and the recovered blocks according to a distribution map of assigned block addresses for each node, and serve the object to the client.

Executing the computer program code by the processor may cause the distributed object archive system to delete the object stored in the archive system by providing a copy of the object with the object's unique identifier, zero length data, and metadata with a more recent time stamp and a delete object flag, using a retrieval process to return an indication that the object does not exist upon recognizing the time stamp as indicating other objects with the same unique identifier are invalid and recognizing the delete record flag, and deleting the copy of the object after a certain period of time.

BRIEF DESCRIPTION OF THE DRAWINGS

The foregoing aspects and other features of the embodiments are explained in the following description, taken in connection with the accompanying drawings, wherein.

DETAILED DESCRIPTION

Figure 1:
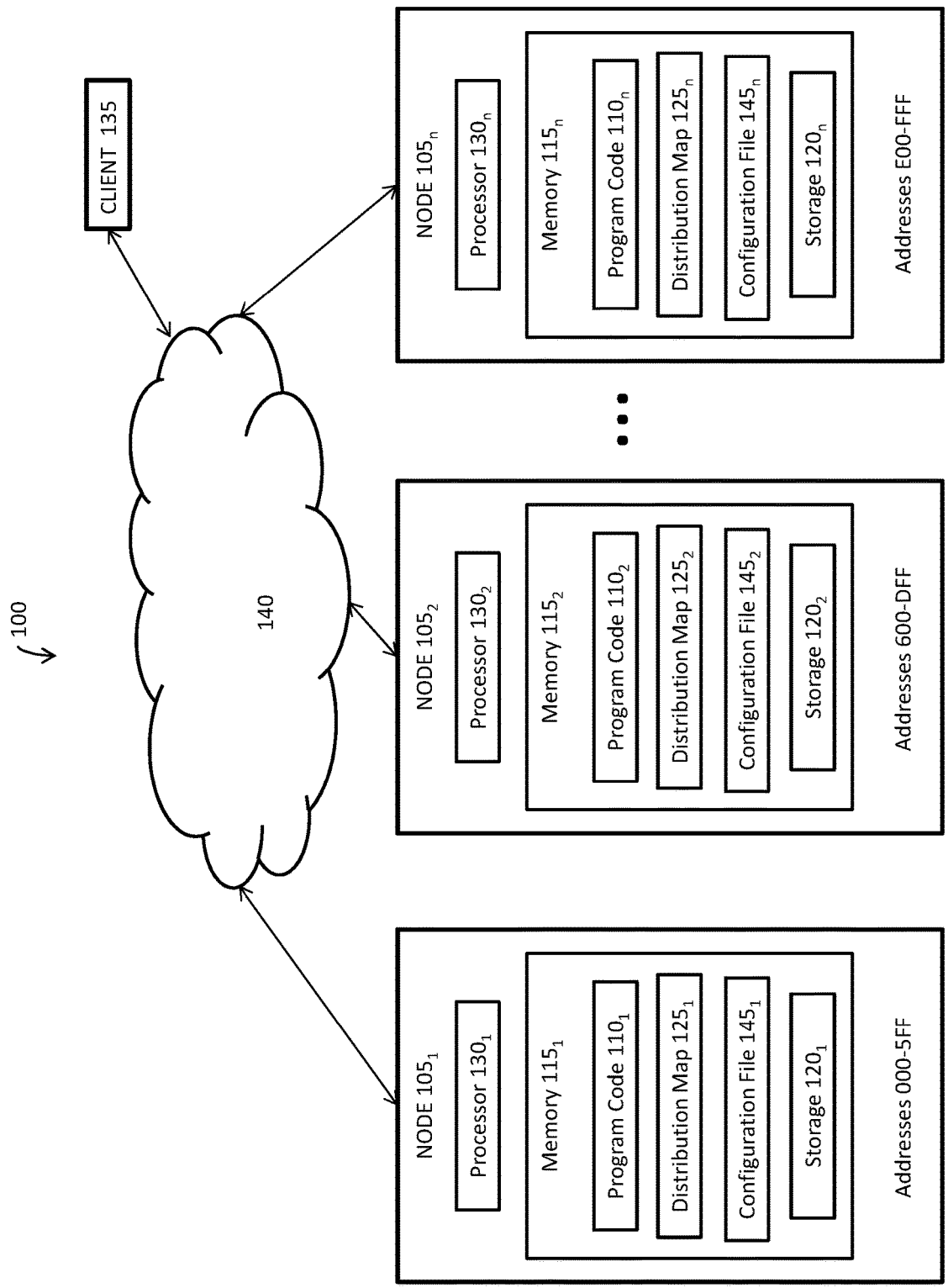
FIG. 1 illustrates an example of an exemplary distributed hash archive system according to the disclosed embodiments.

Although the disclosed embodiments will be described with reference to the embodiments shown in the drawings and described below, it should be understood that these could be embodied in many alternate forms. In addition, any suitable size, shape or type of elements or materials could be used.

The disclosed embodiments are directed to an object based storage system where an object is separated into blocks which are distributed across nodes of the system. Each block is assigned a fixed length hash identification number used to store, manage, and retrieve the block across the system nodes. The object based storage system performs maintenance activities on the blocks to ensure the blocks are stored in the proper location and to correct any data corruption, and deletes objects utilizing a delete record with a more recent time stamp.

Brief definitions of terms used throughout the present disclosure are given below.

The term "Archive" refers to a set of nodes in a system that communicate with each other to store and manage objects.

The term "Block" refers to a piece of an object stored in the archive on a specific node. There are two types of blocks, original and erasure. Original blocks are a part of the raw object pushed to the archive, while erasure blocks hold the error correction codes for that object.

The term "Distribution Map" refers to a mapping of what node and disk manages a bucket. The map is updated when adding new nodes to the system.

The term "Erasure Block" refers to one or more blocks of an object that include parity information for recovering missing or corrupted blocks of the object.

The term "Node" refers to a computer running the software, managing its storage disks and talking with other nodes in the archive to store, retrieve, and validate objects.

The term "Object" refers to a group of blocks stored in the archive, either erasure blocks or replicated blocks.

A schematic block diagram of an exemplary distributed hash archive system 100 is shown in FIG. 1. The system may include one or more nodes $105_1$-$105_n$. Each node $105_1$-$105_n$ may include computer readable program code $110_1$-$110_n$ stored on at least one non-transitory computer readable medium for carrying out and executing all process steps described herein. As a result, a client 135 may interact with any node $105_1$-$105_n$ to store and retrieve data. Each node $105_1$-$105_n$ may include a memory $115_1$-$115_n$ which may also include a storage $120_1$-$120_n$ for storing objects and blocks. The storages $120_1$-$120_n$ may be approximately the same size and may each store the same amount of data, or in some embodiments, may be different sizes and may store an amount of data proportional to the combined size of the storages $120_1$-$120_n$. Each node $105_1$-$105_n$ may be assigned a range of addresses corresponding to the amount of storage $120_1$-$120_n$ on that node. For example, exemplary addresses for Node $105_1$ may include 000-5FF, exemplary addresses for Node $105_2$ may include range from 600-DFF, while exemplary addresses for Node $105_n$ may include E00-FFF.

Throughout the present specification, a reference to node $105_1$ applies equally to each of the nodes $105_2$-$105_n$. The computer readable medium may be a memory $115_1$ of node $105_1$. In alternate aspects, the computer readable program code $110_1$ may be stored in a memory external to, or remote from, node $105_1$. Memory $115_1$ may include magnetic media, semiconductor media, optical media, or any media which is readable and executable by a computer.

In addition to having a storage $120_1$ for storing objects and blocks, memory $115_1$ may also include a distribution map $125_1$ of addresses assigned to all the nodes $105_1$-$105_n$. The distribution map $125_1$ includes a list of all the addresses assigned to every node and is updated each time the storage for a node is changed. For example, if additional storage is added to one or more nodes that results in additional addresses for the distributed hash archive system 100, the new addresses and their associated nodes may be added to all of the distribution maps $125_1$-$125_n$. Additionally, if storage is reduced or deleted for one or more nodes, the addresses may be redistributed to other remaining storages and the distribution maps $125_1$-$125_n$ may be updated to reflect the address distribution.

Node $105_1$ may also include a processor $120_1$ for executing the computer readable program code $120_1$. In at least one aspect, node $105_1$ includes a configuration file $145_1$ for storing operating parameters, and an interface for exchanging information with nodes $105_2$-$105_n$ and one or more clients 135, for example, through a network 140.

The distributed hash archive system 100 may generally appear as a web server to the client 135 and may store an object upon receiving the object with a put command, and may retrieve the object using the object name with a get command. The client 135 may send the object to any of the nodes $105_1$-$105_n$, and each node $105_1$-$105_n$ may be capable of performing all the functions of the disclosed embodiments. Upon receiving a store request, the receiving node allocates resources and initiates procedures for storing the object, and allows the client 135 to include additional, custom metadata if desired.

The object includes a unique identifier, metadata about the object, and data. The metadata may include a size of the data and a cryptologic hash of the object's data and size The node receiving the store request, for example, node $105_1$, may operate to determine a number of same size original blocks into which the object is to be divided for storage. In some embodiments, the number and size may be predetermined. In cases where dividing the object into same size original blocks would result in a number of original blocks less than the predetermined number of blocks, the object may be padded with additional data, for example 0's, to achieve the predetermined number of blocks. For example, in the distributed hash archive system 100, the node receiving the store request, for example, node $105_1$, may be configured to divide an object into a number of original same size blocks that are divisible by 10, and if dividing the object into original same size blocks results in a number of original blocks not divisible by 10, the object may be padded with data to achieve the required number of original blocks to be stored. It should be understood that the predetermined number and predetermined size may be any number and size suitable for storing blocks in the different nodes $105_1$-$105_n$.

Once the number of original blocks to be stored has been determined, a number of erasure blocks to be added when storing the object may also be determined. The number of erasure blocks, and whether to use blocks with erasure codes or replicated blocks as erasure blocks for block recovery, may generally be decided depending on a desired resilience of a recovery process, in the event one or more blocks need to be recovered. The number of erasure blocks, and whether to use erasure encoding or replication for block recovery, may be client selectable or may be determined from the configuration file $145_1$-$145_n$. In some embodiments, if the object is a certain size, for example a single original block, the erasure block may be an actual duplicate of the original block. As another example, if the object is a certain size in bytes, for example, less than or equal to 0.5 MB, but results in a number of original blocks, the erasure blocks may include actual duplicates of each original block.

The node receiving the store request, for example, node $105_1$ may then operate to divide the object into a sequence of blocks for storage, and to distribute the blocks uniformly across all the nodes $105_1$-$105_n$.

In order to distribute the sequence of blocks for storage, the node receiving the store request $105_1$ may operate to calculate a hash value of the unique identifier of the object, utilize the hash value as an address for a first block in the sequence, and store the first block at a node to which the address is assigned. For each subsequent block in the sequence, the node receiving the store request $105_1$ may operate to calculate a subsequent address from a hash value of the address of an immediately previous block in the sequence, and store the subsequent block at a node to which the calculated subsequent address is assigned. If the calculated subsequent address is assigned to a node where a previous block is already stored, the node receiving the store request $105_1$ may operate to iteratively calculate a hash value of the hash value of the subsequent address until an address has been calculated that is not assigned to a node where a previous block is stored. As a result, the address for each block is located on a different node. As the object is divided into blocks and the addresses are calculated, the node receiving the store request $105_1$ may also iteratively calculate the associated erasure blocks.

Figure 2:
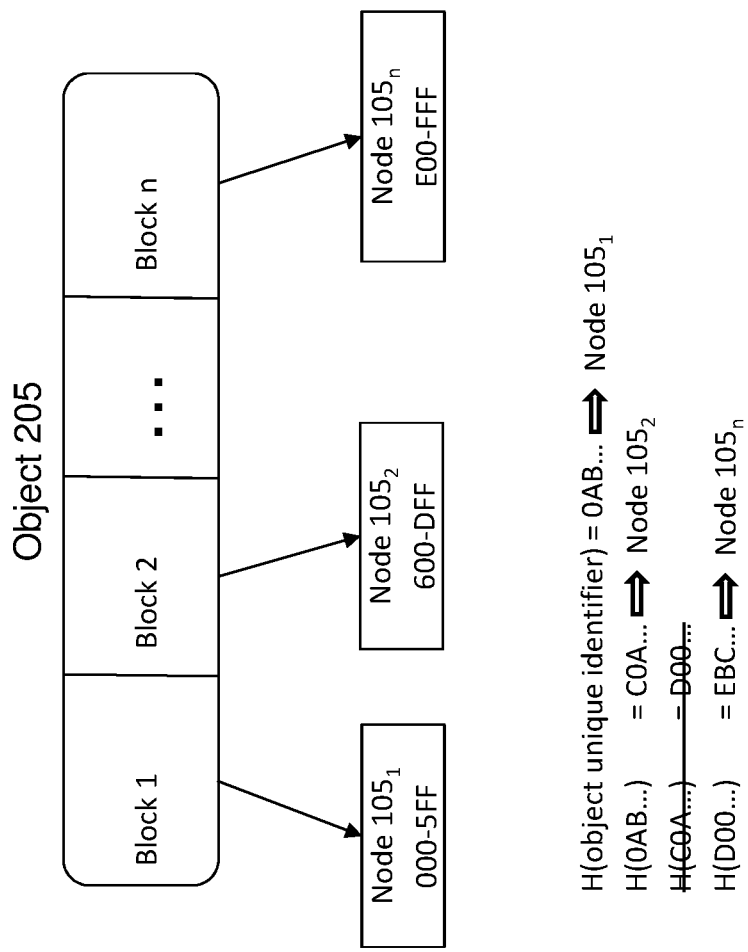
FIG. 2 shows an exemplary illustration of an addressing procedure for an object.

FIG. 2 shows an exemplary illustration of the addressing procedure for an object 205 divided into blocks 1-$n$. Using the object unique identifier name as the seed, the resulting hash value: H (object unique identifier) may be for example, OAB which falls in the address space of Node $105_1$, and is used for the address of block 1. The hash of OAB, H(OAB) may equal COA which falls in the address space of Node $105_2$, may be used for the address of block 2. The hash of COA, H(COA) may equal DOO which would be used as the address of block n, except that DOO also falls in the address space of Node $105_2$. Therefore, the hash of COA is skipped and a hash of DOO is calculated as the address for block n: H(DOO) which may equal EBC. EBC falls in the address space for node $105_n$ and thus may be used as the address for block n. As a result of this hash chain procedure, each block of an object is distributed on unique nodes deterministically.

The assignment of hash values to particular nodes may be determined by a configurable number of significant bits of a hash value. For example, the first 3 characters of a 32 character hash could be used to designate a node. The addressing procedure illustrated in FIG. 2 shows a sample scenario where the calculated addresses could represent the first 3 significant characters of the hash being used for the object 205.

The node receiving the store request $105_1$ may further operate to add validation data to each block, for example, a cryptologic hash of the object's data and size before the addition of any erasure codes, the erasure coding algorithm used for the object, the number of original blocks and the number of erasure blocks of the object, and whether the block is part of a delete object, explained in detail below. Additional validation data that may be added to each block may include the block's position in the sequence of blocks, and a cryptologic hash of the block's data.

The node receiving the store request $105_1$ may use the distribution map $125_1$ to determine which node to send each block based on the block's address. As each block is sent to its respective address, each receiving node may store the block in a staging location until all blocks have arrived at the nodes corresponding to their respective addresses. When all blocks have arrived, the node receiving the store request $105_1$ may send further validation data in the form of a time stamp to each receiving node to be added to each block such that each block of the object has the same time stamp, and each block may then be committed to its respective address at its respective node.

Figure 3:
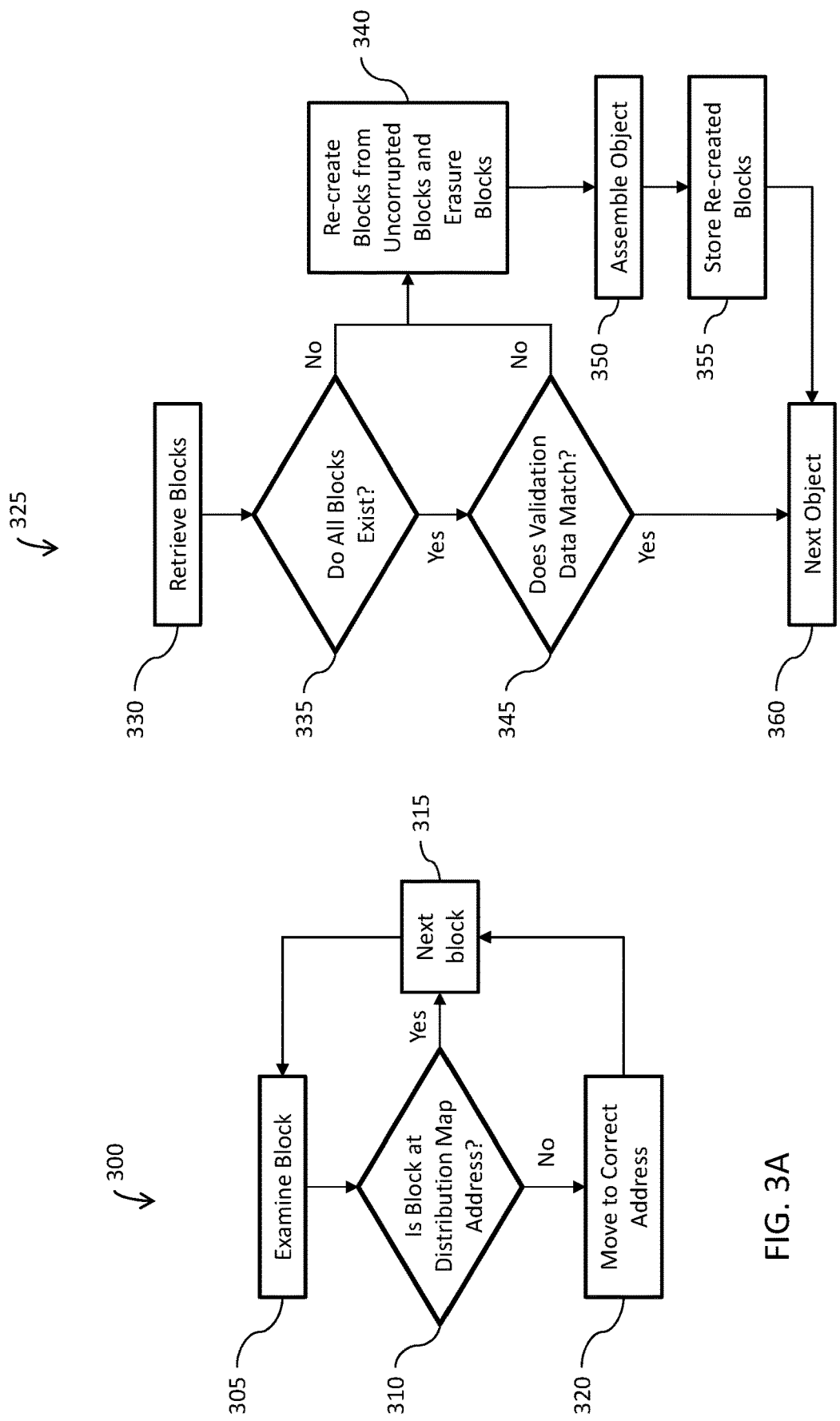
FIGS. 3A and 3B illustrate exemplary maintenance procedures performed by the distributed hash archive system.

Each node $105_1$-$105_n$ may also operate to perform at least one maintenance process that periodically runs in the background on each node $105_1$-$105_n$ and determines whether all blocks in each node $105_1$-$105_n$ are located at the correct addresses and whether any blocks in each node are corrupted. Exemplary maintenance processes are illustrated in FIGS. 3A and 3B. As shown in FIG. 3A, at least one of the maintenance processes 300 may examine each block at each address, as shown in 305, and determine whether the block is at the proper address as designated by the respective distribution map $125_1$-$125_n$, as shown in 310. If the block is located at an address specified by the distribution map $125_1$-$125_n$, the maintenance process may proceed to the next block, as shown in 315, and examine the next block. If the block is located at an address different from that specified by the distribution map $125_1$-$125_n$, the maintenance process may operate to relocate the block to the specified address as shown in 320 and then proceed to the next block 315.

The maintenance process may also use a self-healing periodic internal retrieval process 325 as shown in FIG. 3B to determine if any blocks have been corrupted, use erasure blocks and data stored with the uncorrupted blocks to recover the corrupted blocks, and store the recovered blocks at the proper locations. The internal retrieval process 325 attempts to retrieve all the blocks of an object from all the nodes on which the blocks are located, as determined by the distribution maps $125_1$-$125_n$, as shown in 330. As stated above, each block includes validation data including a cryptologic hash of the object's data and size before the addition of any erasure codes, the erasure coding algorithm used for the object, the number of original blocks and the number of erasure blocks of the object, the block's position in the sequence of blocks, a cryptologic hash of the block's data, and a common time stamp indicating when all the blocks of an object were committed to storage.

Using the validation data, the maintenance process verifies that each block exists as shown in 335. If all the blocks initially exist and all have matching validation data as shown in 345, the process moves to retrieve the next object as shown in 360. Otherwise, blocks that do not exist are recreated from the uncorrupted blocks and the erasure blocks as shown in 340. The maintenance process may then verify that the validation data of each existing block matches as shown in 345. Blocks with validation data that does not match are also recreated from the uncorrupted blocks and the erasure blocks as shown in 340. Various arbitration and consensus processes may be used to determine the correct validation data when a number of different values of a validation data item are found among the blocks. It should also be understood that any or all of the validation data items may be used to determine if the validation data items match. The recreated blocks and existing blocks with matching validation data are assembled as the object as shown in 350, and the re-created blocks are stored at the correct nodes according to the distribution maps $125_1$-$125_n$, as shown in 355 and the process moves to retrieve the next object as shown in 360.

Figure 4:
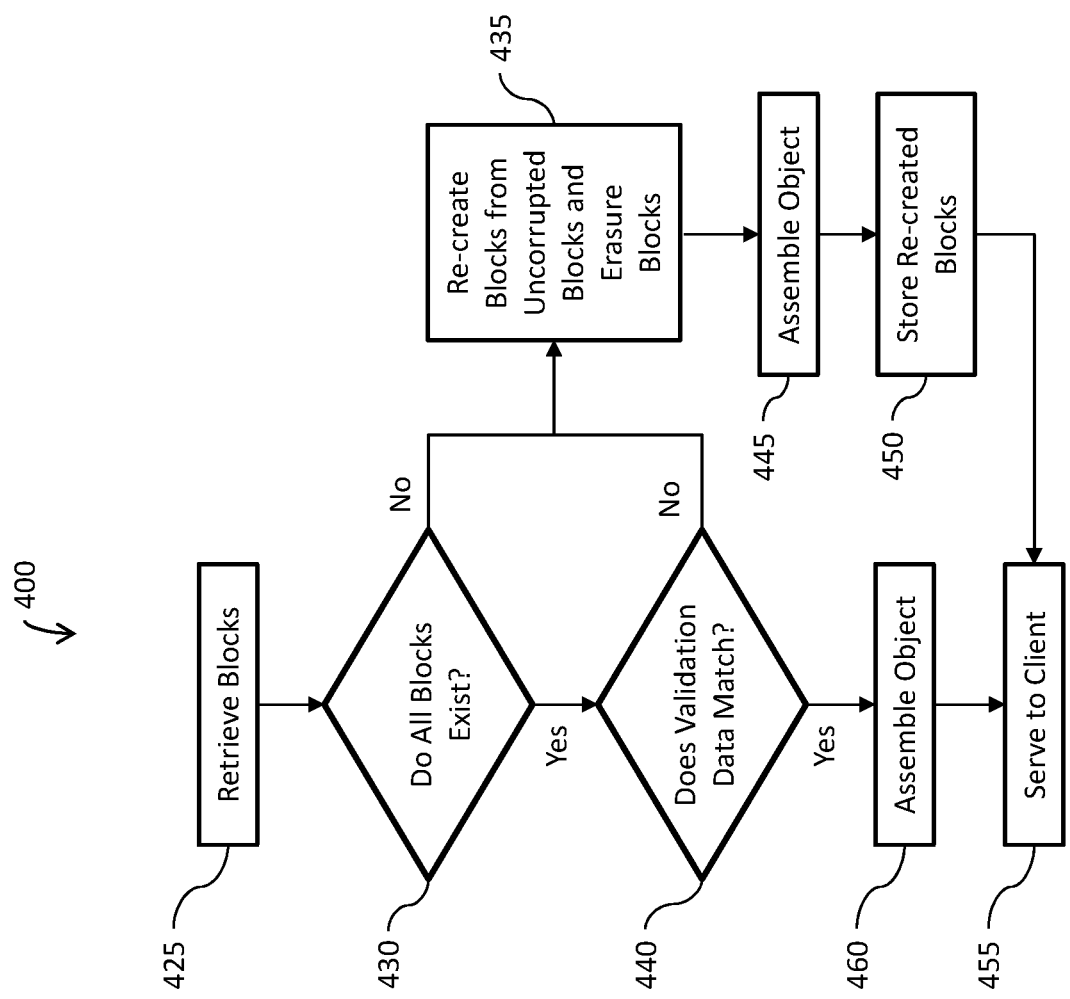
FIG. 4 shows a client retrieval process according to the disclosed embodiments.

A client may retrieve an object from the distributed hash archive system 100 using a client retrieval process 400 as shown in FIG. 4. The client retrieval process may be initiated by the client 135 issuing a get command with a name of the object being retrieved. The client 135 may send the get command to any of the nodes $105_1$-$105_n$, and each node $105_1$-$105_n$ may be capable of assembling the object being retrieved.

The client retrieval process 400 attempts to retrieve all the blocks of the object from all the nodes on which the blocks are located, as determined by the distribution maps $125_1$-$125_n$, as shown in 425. Each block includes validation data as stated above. Using the validation data, the client retrieval process 400 verifies that each block exists as shown in 430 and that all have matching validation data as shown in 440. If all the blocks initially exist and all have matching validation data, the client retrieval process 400 assembles the object as shown in 460 and services the object to the client as shown in 455. Blocks that do not exist are recreated from the uncorrupted blocks and the erasure blocks as shown in 435 and blocks with validation data that does not match are also recreated from the uncorrupted blocks and the erasure blocks as shown in 435. As mentioned above, various arbitration and consensus processes may be used to determine the correct validation data when a number of different values of a validation data item are found among the blocks, and that any or all of the validation data items may be used to determine if the validation data items match.

The recreated blocks and existing blocks with matching validation data are assembled as the object as shown in 445, the re-created blocks are stored at the correct nodes according to the distribution maps $125_1$-$125_n$, as shown in 450, and is served to the client as shown in 455.

Typically, when deleting an object in a dynamic object based storage system when one or more nodes are unavailable, it is important to ensure that those nodes are notified of the deletion when they become available. In order to ensure that objects are properly deleted, the distributed hash archive system 100 utilizes a specifically constructed delete object. The delete object may be a copy of an object to be deleted with the object to be deleted's unique identifier but with zero length data, where the metadata includes a more recent time stamp and a flag indicating that the object is a delete object. When a retrieve process, such as the periodic internal retrieval process 325 shown in FIG. 3B, or the client retrieval process 400 shown in FIG. 4 executes, the retrieve process will recognize the object's more recent time stamp as indicating other objects with the same unique identifier are invalid, and will recognize the delete record flag, and rather than serving the object to the client, the retrieve process returns an indication that the object does not exist. As a result, the blocks of the deleted object will be overwritten. In addition, the delete object operates to endure that if enough nodes are unavailable when a delete occurs, that the associated object will not be recovered. The periodic internal retrieval process 325 may be configured to remove delete objects after a specified period of time.

Thus the disclosed embodiments provide an object based storage system where an object is separated into blocks which are uniformly distributed across nodes of the system using addresses generated by an iterative hashing operation that uses the object's unique identifier as a seed. The object based storage system performs maintenance activities on the blocks to ensure the blocks are stored in the proper location and to correct any data corruption, and deletes objects utilizing a unique delete object.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

The invention claimed is:

1. A method of managing objects in an archive system, the method comprising:
   assigning a number of addresses to each of a plurality of nodes of the archive system;
   dividing an object into a sequence of blocks for storage;
   uniformly distributing the sequence of blocks across the plurality of nodes by;
      calculating a hash value of a unique identifier of the object, the hash value to be used as an address for a first block in the sequence and storing the first block at one of the plurality of nodes to which the one of the number of addresses is assigned to the node;
      for each subsequent block in the sequence, calculating a subsequent address from a hash value of the address of an immediately previous block in the sequence and storing the subsequent block at one of the plurality of nodes to which the one of the calculated subsequent number of addresses is assigned to the node;
      iteratively calculating a hash value of the hash value of the subsequent address if the calculated subsequent address is assigned to one of the plurality of nodes where a block is stored; and
      storing the subsequent block at one of the plurality of nodes to which an address previously assigned to the node corresponding to the iteratively calculated hash value is assigned.

2. The method of claim 1 wherein dividing the object into a sequence of blocks for storage comprises:
   adding null data to the object to achieve a number of same size blocks into which the object is to be divided; and
   adding one or more erasure blocks to the object for recovering the object if one or more of the same size blocks are corrupted.

3. The method of claim 2 wherein the one or more erasure blocks are replicas of one or more of the same size blocks.

4. The method of claim 1 further comprising;
   maintaining a distribution map of assigned block addresses for each node; and
   periodically comparing an address of a block to the assigned block addresses of the distribution map; and moving the block to the address to which the block is assigned in the distribution map if the address of the block does not match the block address is assigned in the distribution map.

5. The method of claim 1 further comprising;
   periodically retrieving an object from the archive system;
   upon verifying that all the blocks of the object exist and have matching validation data, retrieving a next object, otherwise;
   recovering missing blocks utilizing one or more erasure blocks added to the object when stored;
   recovering blocks with incorrect metadata utilizing the one or more erasure blocks;
   assembling the existing blocks and the recovered blocks as the object; and
   storing the existing blocks and the recovered blocks according to a distribution map of assigned block addresses for each node.

6. The method of claim 1 further comprising;
   retrieving the object stored in the archive system;
   upon verifying that all the blocks of the object exist and have matching validation data, serving the object to a client, otherwise;
   recovering missing blocks utilizing one or more erasure blocks added to the object when stored;
   recovering blocks with incorrect metadata utilizing the one or more erasure blocks;
   assembling the existing blocks and the recovered blocks as the object;
   storing the existing blocks and the recovered blocks according to a distribution map of assigned block addresses for each node; and
   serving the object to the client.

7. The method of claim 1 further comprising;
   deleting the object stored in the archive system by:
      providing a copy of the object with the object's unique identifier, zero length data, and metadata with a more recent time stamp and a delete object flag;
      using a retrieval process to return an indication that the object does not exist upon recognizing the time stamp as indicating other objects with the same unique identifier are invalid and recognizing the delete record flag; and
      deleting the copy of the object after a certain period of time.

8. A distributed object archive system comprising:
   a plurality of nodes, each node comprising:
      a processor,
      a memory including computer program code;
      wherein executing the computer program code by the processor causes the distributed object archive system to:
         assign a number of addresses to each node of the plurality of the nodes of the archive system;
         divide an object for storage into a sequence of blocks;
         uniformly distribute the sequence of blocks across the plurality of nodes by;
            calculating a hash value of a name of the object, the hash value to be used as an address for a first block in the sequence and storing the first block at one of the plurality of nodes to which the one of the addresses is assigned;
            for each subsequent block in the sequence, calculating a subsequent address from a hash value of the address of an immediately previous block in the sequence and storing the subsequent block at one of the plurality of nodes to which the one of the calculated subsequent address is assigned;
            iteratively calculating a hash value of the hash value of the subsequent address if the calculated subsequent number of addresses is assigned to a node where a previous block is stored; and
            storing the subsequent block at one of the plurality of nodes to which an address previously assigned to the node corresponding to the reiteratively calculated hash value is assigned.

9. The distributed object archive system of claim 8, wherein dividing the object into a sequence of blocks for storage comprises:
  adding null data to the object to achieve a number of same size blocks into which the object is to be divided; and
  adding one or more erasure blocks to the object for recovering the object if one or more of the same size blocks are corrupted.

10. The distributed object archive system of claim 9, wherein the one or more erasure blocks are replicas of one or more of the same size blocks.

11. The distributed object archive system of claim 8, comprising;
  a distribution map of assigned block addresses for each node;
  wherein executing the computer program code by the processor causes the distributed object archive system to:
    periodically compare an address of a block to the assigned block addresses of the distribution map; and
    move the block to the address to which the block is assigned in the distribution map if the address of the block does not match the block address is assigned in the distribution map.

12. The distributed object archive system of claim 8, wherein executing the computer program code by the processor causes the distributed object archive system to:
  periodically retrieve an object from the archive system;
  upon verifying that all the blocks of the object exist and have matching validation data, retrieve a next object, otherwise;
  recover missing blocks utilizing one or more erasure blocks added to the object when stored;
  recover blocks with incorrect metadata utilizing the one or more erasure blocks;
    assemble the existing blocks and the recovered blocks as the object; and
    store the existing blocks and the recovered blocks according to a distribution map of assigned block addresses for each node.

13. The distributed object archive system of claim 8, wherein executing the computer program code by the processor causes the distributed object archive system to:
  retrieve the object stored in the archive system;
  upon verifying that all the blocks of the object exist and have matching validation data, serve the object to a client, otherwise;
  recover missing blocks utilizing one or more erasure blocks added to the object when stored;
  recover blocks with incorrect metadata utilizing the one or more erasure blocks;
  assemble the existing blocks and the recovered blocks as the object;
  store the existing blocks and the recovered blocks according to a distribution map of assigned block addresses for each node; and
  serve the object to the client.

14. The distributed object archive system of claim 8, wherein executing the computer program code by the processor causes the distributed object archive system to:
  delete the object stored in the archive system by:
    providing a copy of the object with the object's unique identifier, zero length data, and metadata with a more recent time stamp and a delete object flag;
    using a retrieval process to return an indication that the object does not exist upon recognizing the time stamp as indicating other objects with the same unique identifier are invalid and recognizing the delete record flag; and
    deleting the copy of the object after a certain period of time.

\* \* \* \* \*